L. HOSKINS.
VEHICLE WHEEL.
APPLICATION FILED OCT. 9, 1911.
1,060,256.
Patented Apr. 29, 1913.
3 SHEETS—SHEET 3.
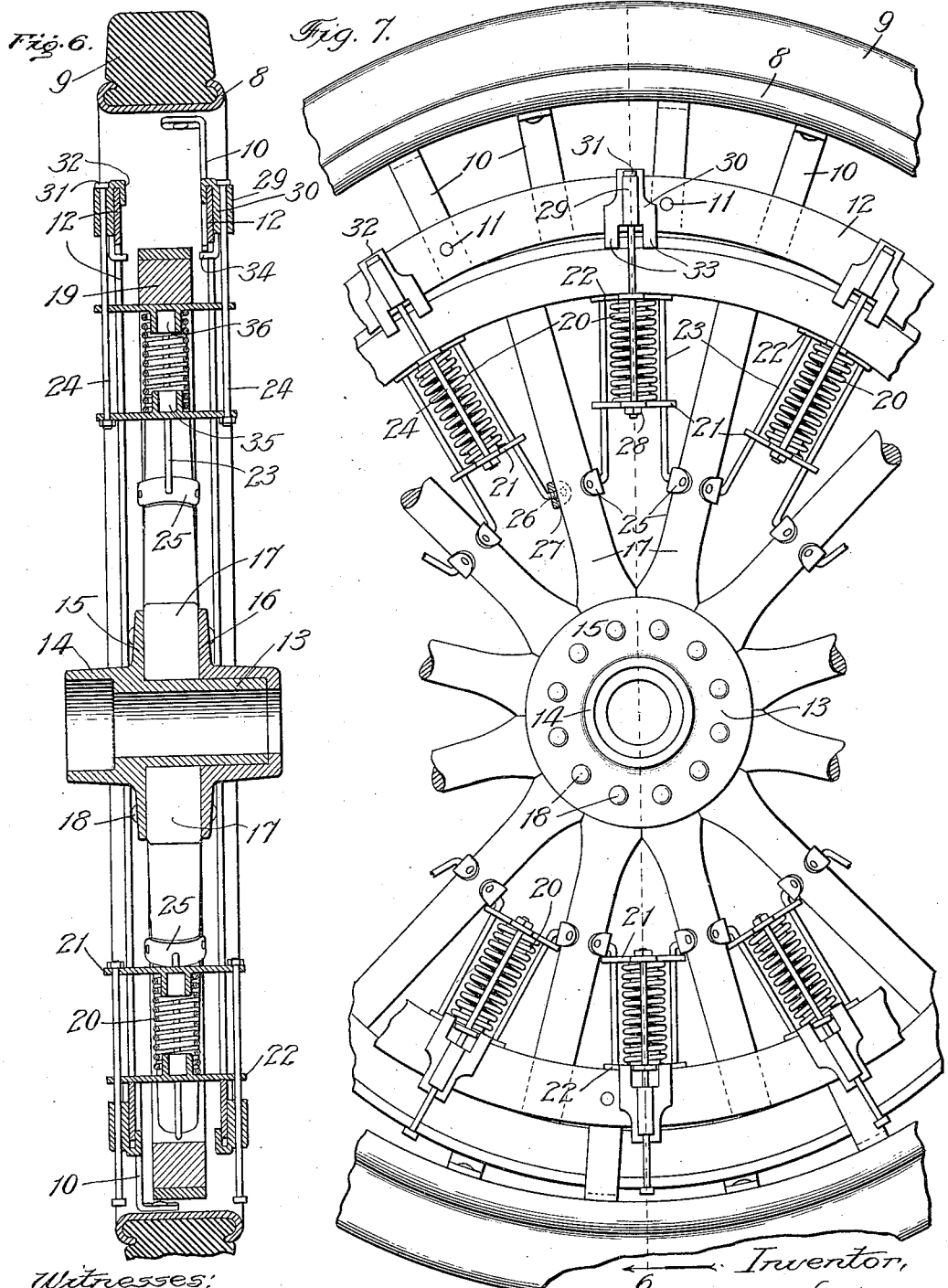
Witnesses:
Inventor,
Lawrence Hoskins,

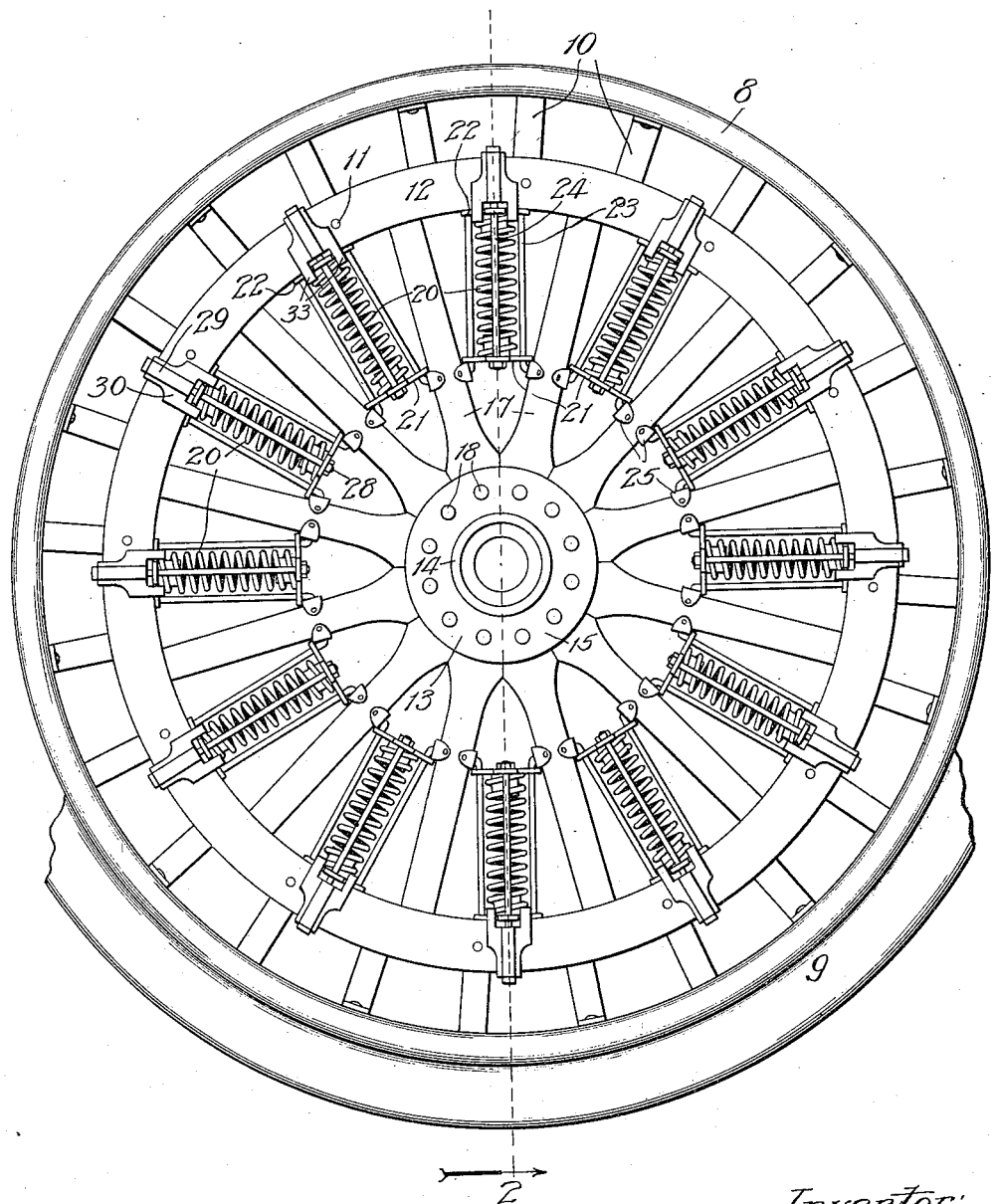

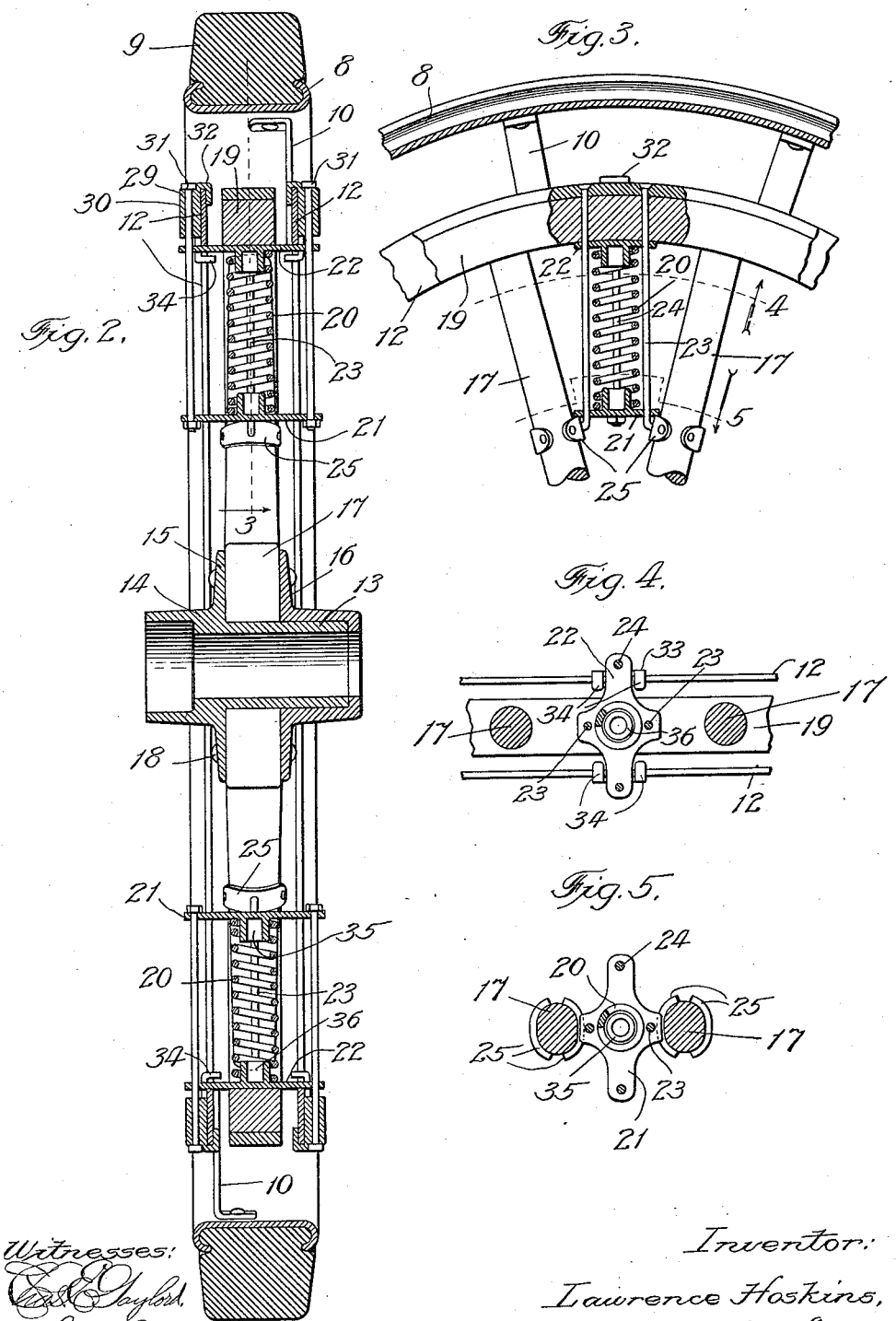

UNITED STATES PATENT OFFICE.

LAWRENCE HOSKINS, OF PLAINVILLE, ILLINOIS.

VEHICLE-WHEEL.

1,060,256.   Specification of Letters Patent.   Patented Apr. 29, 1913.

Application filed October 9, 1911.   Serial No. 653,514.

*To all whom it may concern:*

Be it known that I, LAWRENCE HOSKINS, a citizen of the United States, residing at Plainville, in the county of Adams and State of Illinois, have invented a new and useful Improvement in Vehicle-Wheels, of which the following is a specification.

My invention relates to improvements in wheels of the type in which the hub portion thereof is yieldingly supported on the rim of the wheel through the medium of springs for rendering the wheel resilient; and more particularly to those wheels in which a single annular series of springs are provided and which are so related to other parts of the wheel as to cause the springs both above and below the hub, as well as the intermediate springs, to be similarly actuated in the operation of the wheel and preferably compressed.

My primary object is to simplify the construction of wheels of the variety above referred to, and to provide a construction of wheel which will present the advantages of pneumatic tires without the disadvantages thereof, and generally to so improve upon wheels of this type as to render them better adapted to perform the functions for which they are intended.

Referring to the accompanying drawings, Figure 1 is a view in side elevation of a wheel constructed in accordance with my invention, a portion of the tire being broken away. Fig. 2 is an enlarged section taken at line 2 on Fig. 1 and viewed in the direction of the arrow. Fig. 3 is a view in elevation of a section of the wheel of Fig. 1, showing portions thereof in section at the line 3 on Fig. 2 and viewed in the direction of the arrow. Fig. 4 is a section taken at line 4 on Fig. 3 and viewed in the direction of the arrow. Fig. 5 is a section taken at the irregular line 5 on Fig. 3 and viewed in the direction of the arrow. Fig. 6 is a section taken at the line 6 on Fig. 7 and viewed in the direction of the arrow, this view showing the springs compressed; and Fig. 7 is a broken face view of the wheel of Fig 1 showing the positions the parts thereof assume when the springs are compressed.

The rim of the wheel, which is represented at 8, is shown of a form for receiving and holding a cushion tire represented at 9, though the rim, as will be readily understood, so far as my invention is concerned, need not be equipped with a yielding tire. The rim 8 carries radially and inwardly extending angular clips 10 which are secured to the inner periphery of the rim 8 and are arranged in staggered relation, as represented in Figs. 1, 2, 6 and 7. The inner ends of the clips 10 are rigidly fastened, as by rivets 11, to the inner sides of a pair of flat rings 12 which extend concentric with the rim 8 and parallel with each other and spaced apart, as shown in Fig. 2, whereby the rim 8 and ring 12 are securely connected together.

The hub-section of the wheel is represented at 13 and is formed of a hub proper 14 having a fixed flange 15 and a removable flange 16 between which a series of spokes 17 are rigidly secured at their inner ends, as by rivets 18. The spokes 17 which extend normally into the space between the rings 12 are connected together at their outer ends by a ring 19 which forms a felly, and when no weight is on the wheel, this felly lies within the space between the rings 12, as represented in Fig. 2, it being preferred that the felly be sufficiently narrow to cause it to be out of contact with the clips 10.

The hub section 13 is supported from the rim 8 through the medium of a series of radially-extending, preferably coiled, springs 20 which are confined between plates 21 and 22 forming spring-bearings, the latter being located in the spaces between the spokes and slidable on radially-extending rods 23 and 24, a pair of each of these rods being provided for each spring and opposing each other, as represented in Figs. 4 and 5. The rods 23 are disposed in the plane occupied by the spokes 17, these rods being secured at their lower ends to the spokes through the medium of clips 25, into which the inner deflected ends 26 of these rods screw, as indicated at 27 in Fig. 7, the outer ends of these rods being rigidly secured in the felly 19. The rods 24, which are parallel to but are arranged in a right-angle position with relation to, the rods 23 pass through the plates 21 and at their inner protruding ends are equipped with stops 28 which, in the construction shown, are in the form of nuts screwed upon the threaded ends of the rods. The rods 24 also extend through the plates 22 and are slidingly confined in bearings 29 in clips 30 provided on the rings 12 at opposite sides thereof, the outer ends of these rods having shoulders 31 forming stops. The clips 30 are provided at their outer ends with angled flanges 32 which fit over the peripheries of the rings 12, as illustrated in Fig. 2, the inner ends of these clips being bifurcated to afford arms 33 which are inwardly bent to afford flanges 34.

The springs 20 surround, at their opposite ends, short cylindrical bosses 35 and 36 on the plates 21 and 22 respectively, and are preferably assembled, with the other parts of the wheel, in relatively high compressed condition, these springs operating normally to force the plates 21 into engagement with the outer edges of the clips 25, as represented in Fig. 1, and to force the plates 22 into engagement with the inner peripheries of the rings 12 and the felly 19.

It will be manifest from the foregoing description that when the wheel is in use the hub-section thereof will move downwardly with relation to the rim section of the wheel against the resistance of the springs 20, the plates 21 coöperating with the springs 20 above the center of the wheel being held against downward movement by engagement with the stops 28, the rods 24 upon which the stops 28 are provided being held against downward movement by engagement of the stops 31 with the outer ends of the bearings 29, whereas the plates 22 above the center of the wheel move downwardly by reason of their engagement with the inner periphery of the felly 19, thereby compressing the springs 20 between the plates 21 and 22. The plates 22 coöperating with the springs 20 below the center of the wheel are held against downward movement by engagement with the inner peripheries of the rings 12, whereas the plates 21 are moved downwardly by engagement with the clips 25 on the spokes, thereby compressing these springs.

It will be understood that in the operation of the wheel in rolling over the ground the greatest stress is imposed upon the springs 20 as they are successively moved into a position immediately above and below the axis upon which the wheel rotates; and that the weight upon the hub section of the wheel is carried by springs operating in the same direction, namely, in the preferred arrangement illustrated, in a direction for compressing the springs 20. Furthermore, it will be noted that the frictional clamping of the hub section to the rim section of the wheel occurs at the inner and outer peripheries of the rings 12, and as these rings may be placed very close to the rim 8, tendency of the hub section and rim section to move relatively to each other circumferentially is reduced to the minimum.

As the rods 24 extending through the plates 22 are guidingly confined in the clips 30 which interlock with the rings 12, the latter are held against spreading under lateral strains exerted against them when the wheel is in use, as in the case of skidding of the vehicle equipped with the wheels, and thus the alinement of the parts of the wheel is preserved and its stability insured.

While I have illustrated and described a particular embodiment of my invention, I do not wish to be understood as intending to limit it to such embodiment, as the structure shown may be materially modified and altered without departing from the spirit of my invention.

What I claim as new, and desire to secure by Letters Patent, is—

1. In a vehicle-wheel, the combination of a felly-frame and rim-frame, one movable vertically with relation to the other, annular series of radially-movable spring-supporting bearings within the circumference of the felly-frame and arranged one within the other, one of said series of bearings movably engaging with said rim-frame and felly-frame, and the other of said series of bearings movably engaging with said felly-frame, an annular series of compression-springs confined between the companion bearings, and stop-members on said rim-frame with which said last referred to series of bearings movably engage, for the purpose set forth.

2. In a vehicle-wheel, the combination of a felly-frame and rim-frame, one movable vertically with relation to the other, an outer rim-section, clips arranged in staggered relation and connecting said outer rim-section and rim-frame in rigid relation to each other, annular series of radially-movable spring-supporting bearings within the circumference of the felly-frame and arranged one within the other, one of said series of bearings movably engaging with said rim-frame and felly-frame, and the other of said series of bearings movably engaging with said felly-frame, an annular series of compression-springs confined between the companion bearings, and members carried by said rim-frame and extending radially toward the center of the wheel, said members being provided with stops with which said last referred to series of bearings movably engage, for the purpose set forth.

3. In a vehicle-wheel, the combination of a felly-frame and rim-frame, one movable vertically with relation to the other, an outer rim-section, clips arranged in staggered relation and connecting said outer rim-section and rim-frame in rigid relation to each other, annular series of radially-movable spring-supporting bearings within the circumference of the felly-frame and arranged one within the other, one of said series of bearings movably engaging with said rim-frame and felly-frame, and the other of said series of bearings movably engaging with said felly-frame, an annular series of compression-springs confined between the companion bearings, stop-members on said rim-frame with which said last referred to series of bearings movably engage, and means for guiding said bearings in their radial movements, for the purpose set forth.

4. In a vehicle-wheel, the combination of a felly-frame and rim-frame, one movable vertically with relation to the other, an outer rim-section, clips arranged in staggered relation and connecting said outer rim-section and rim-frame in rigid relation to each other, annular series of radially-movable spring-supporting bearings within the circumference of the felly-frame and arranged one within the other, one of said series of bearings movably engaging with said rim-frame and felly-frame, and the other of said series of bearings movably engaging with said felly-frame, an annular series of compression-springs confined between the companion bearings, stop-members on said rim-frame with which said last referred to series of bearings movably engage, and pairs of rods connected with said felly-frame and on which said bearings are guidedly confined, for the purpose set forth.

5. In a vehicle-wheel, the combination of a felly-frame and rim-frame, one movable vertically with relation to the other, an outer rim-section, clips arranged in staggered relation and connecting said outer rim-section and rim-frame in rigid relation to each other, said rim-frame being formed with a pair of spaced rings and said felly-frame extending at its felly between said rings, annular series of radially-movable spring-supporting bearings within the circumference of the felly-frame and arranged one within the other, one of said series of bearings movably engaging with said felly and with said rings and the other of said series of bearings movably engaging with said felly-frame, an annular series of compression-springs confined between the companion bearings, and stop-members on said rim-frame with which said last referred to series of bearings movably engage, for the purpose set forth.

6. In a vehicle-wheel, the combination of a felly-frame and rim-frame, one movable vertically with relation to the other, an outer rim-section, clips arranged in staggered relation and connecting said outer rim-section and rim-frame in rigid relation to each other, said rim-frame being formed with a pair of spaced rings and said felly-frame extending at its felly between said rings, radially-extending guides on said felly-frame, an inner and outer series of bearing-plates movable on said guides, the outer ones of said bearings overlapping said rings and felly and the inner ones of said plates movably engaging with the felly-frame, springs confined between each pair of plates, and stop-members on said rings with which the inner ones of said bearings movably engage.

7. In a vehicle-wheel, the combination of a rim-frame formed with a pair of rings spaced apart, a felly-frame the felly of which extends between said rings, said felly-frame and rim-frame being relatively movable vertically, pairs of radially-extending guide-rods on said felly-frame, an inner and outer series of bearing-plates slidable on said rods, the outer ones of said plates overlapping said rings and said felly at their inner peripheries and the inner ones of said plates movably engaging with said felly-frame, springs confined between each pair of plates, and rods carried by said rings and radiating inwardly therefrom and provided with stops on their inner ends movably engaging with the inner series of said plates, for the purpose set forth.

8. In a vehicle-wheel, the combination of a rim-frame formed with a pair of rings spaced apart, a felly-frame formed with an annular felly extending into the space between said rings, said felly-frame and rim-frame being relatively movable vertically, pairs of radially-extending rods connected with said felly-frame, an inner and outer annular series of bearing-plates guidedly confined on said rods, the outer series of said plates overlapping said rings and felly and the inner series of said plates movably engaging with said felly-frame, a coiled spring between each pair of plates, clips carried by said rings, and rods on said clips extending radially toward the center of the wheel and provided with stops movably engaging with the inner series of plates, for the purpose set forth.

9. In a vehicle-wheel, the combination of a rim-frame formed with a pair of rings spaced apart, a felly-frame formed with an annular felly extending into the space between said rings, said felly-frame and rim-frame being relatively movable vertically, pairs of radially-extending rods connected with said felly-frame, an inner and outer annular series of bearing-plates guidedly confined on said rods, the outer series of said plates overlapping said rings and felly and the inner series of said plates movably engaging with said felly-frame, a coiled spring between each pair of plates, clips overlapping the outer peripheries of said rings, and radial rods carried by said clips and extending toward the center of the wheel, said rods being provided with stops with which said inner series of plates movably engage, for the purpose set forth.

10. In a vehicle-wheel, the combination of a felly-frame and a rim-frame relatively movable vertically, said rim-frame being formed with a pair of spaced rings and said felly-frame being formed with a felly extending into the space between said rings, pairs of radially-extending rods connected with said felly-frame, an outer and an inner series of bearing-plates slidably engaging with said rods, the outer ones of said plates overlapping the inner peripheries of said rings and felly, and the inner ones of said plates movably engaging with said felly-frame, springs confined between said pairs of rods, and radiating rods carried by said rings, said rods extending through the outer series of plates and provided at their inner ends with stops with which the inner series of said plates movably engage, for the purpose set forth.

LAWRENCE HOSKINS.

In presence of—
CHARLES A. WAGY,
JOE W. MILLER.

Copies of this patent may be obtained for five cents each, by addressing the "Commissioner of Patents, Washington, D. C."